US009764722B2

(12) United States Patent
Casali et al.

(10) Patent No.: US 9,764,722 B2
(45) Date of Patent: Sep. 19, 2017

(54) BRAKE SYSTEM FOR CONTROLLING A BRAKE OF A UNIT HAULED BY A VEHICLE

(71) Applicant: CNH Industrial America LLC, New Holland, PA (US)

(72) Inventors: Paolo Casali, Modena (IT); Giorgio Benedetti, Modena (IT); Gabriele Ferola, Imola (IT)

(73) Assignee: CNH Industrial America LLC, New Holland, PA (US)

( * ) Notice: Subject to any disclaimer, the term of this patent is extended or adjusted under 35 U.S.C. 154(b) by 164 days.

(21) Appl. No.: 14/654,332

(22) PCT Filed: Dec. 19, 2013

(86) PCT No.: PCT/EP2013/077321
§ 371 (c)(1),
(2) Date: Jun. 19, 2015

(87) PCT Pub. No.: WO2014/096156
PCT Pub. Date: Jun. 26, 2014

(65) Prior Publication Data
US 2016/0214590 A1    Jul. 28, 2016

(30) Foreign Application Priority Data

Dec. 21, 2012    (IT) .............................. MO2012A0322

(51) Int. Cl.
*B60T 11/20*    (2006.01)
*B60T 11/21*    (2006.01)
(Continued)

(52) U.S. Cl.
CPC .............. *B60T 11/21* (2013.01); *B60T 7/042* (2013.01); *B60T 7/20* (2013.01); *B60T 8/1708* (2013.01);
(Continued)

(58) Field of Classification Search
CPC . B60T 11/20; B60T 11/21; B60T 7/20; B62D 11/08
See application file for complete search history.

(56) References Cited

U.S. PATENT DOCUMENTS 5,190,356 A * 3/1993 Knowles ............... F16K 11/048
137/111
6,592,190 B2 * 7/2003 Dunbar ................... B60T 13/16
303/7

(Continued)

FOREIGN PATENT DOCUMENTS

DE    2052401    4/1972
DE    3625025    10/1987
(Continued)

OTHER PUBLICATIONS

PCT International Search Report and Written Opinion mailed Jan. 30, 2014.

*Primary Examiner* — Nicholas J Lane
(74) *Attorney, Agent, or Firm* — Rickard K. DeMille; Rebecca L. Henkel (57) ABSTRACT

A brake system for controlling a brake of a unit hauled by a vehicle, the brake system including a first pedal for braking a right rear wheel of the vehicle through a first braking circuit, a second pedal for braking a left rear wheel of the vehicle through a second braking circuit, an input line arrangement including a first input line for receiving a fluid from the first braking circuit and a second input line for receiving a fluid from the second braking circuit, at least one output line for sending a fluid to the brake of the hauled unit, and a selective connector for selectively connecting the input line arrangement to the output line by setting a first connection configuration when the vehicle has a speed greater than a threshold value and a second connection configuration when the vehicle has a speed lower than the
(Continued)

threshold value, whereby in the first connection configuration pushing any of the pedals activates the brake of the hauled unit, and in the second connection configuration pushing only one of the pedals leaves the brake of the hauled unit inactive, so that the vehicle can be steered by braking.

16 Claims, 8 Drawing Sheets

(51) Int. Cl.
    *B60T 7/20*     (2006.01)
    *B60T 8/17*     (2006.01)
    *B60T 8/24*     (2006.01)
    *B60T 7/04*     (2006.01)
    *B60T 13/66*     (2006.01)
    *B60T 13/68*     (2006.01)

(52) U.S. Cl.
    CPC .............. *B60T 8/246* (2013.01); *B60T 8/248* (2013.01); *B60T 13/662* (2013.01); *B60T 13/683* (2013.01)

(56) References Cited

U.S. PATENT DOCUMENTS

| | | | |
|---|---|---|---|
| 8,292,051 B2* | 10/2012 | Cadeddu | B60T 11/21 188/345 |
| 2003/0071517 A1* | 4/2003 | Weil | B60T 11/21 303/9.61 |
| 2005/0206224 A1 | 9/2005 | Lu | |
| 2005/0206229 A1 | 9/2005 | Lu et al. | |
| 2005/0206233 A1 | 9/2005 | Offerle et al. | |
| 2005/0236896 A1 | 10/2005 | Offerle et al. | |
| 2009/0250997 A1* | 10/2009 | Mamei | B60T 11/21 303/117.1 |
| 2015/0344011 A1* | 12/2015 | Casali | B60T 7/04 303/7 |

FOREIGN PATENT DOCUMENTS

| | | |
|---|---|---|
| EP | 0084687 | 6/1982 |
| EP | 0688712 | 12/1995 |
| WO | 2009090078 | 7/2009 |

* cited by examiner

BRAKE SYSTEM FOR CONTROLLING A BRAKE OF A UNIT HAULED BY A VEHICLE

CROSS REFERENCE TO RELATED APPLICATIONS

This application is a national stage of PCT Application No. PCT/EP2013/077321, entitled "A BRAKE SYSTEM FOR CONTROLLING A BRAKE OF A UNIT HAULED BY A VEHICLE", filed on Dec. 19, 2013, which claims priority from and the benefit of Italian Patent Application Serial No. MO2012A000322, filed on Dec. 21, 2012. Each of the foregoing applications is hereby incorporated by reference in its entirety.

The invention relates to a brake system for controlling a brake of a unit hauled by a vehicle. The brake according to the invention is particularly suitable for working vehicles such as tractors. The unit hauled by the vehicle may be any kind of trailer, for example intended to carry a load, but also an equipment which is capable of performing a desired operation, such as a ground handling equipment, a fertilizer spreader, a sprayer or the like. The unit hauled by the vehicle might also be a further vehicle which cannot advance alone, for example because it is not motorized.

Known tractors usually have two brake pedals, each of which is connected to a cylinder in order to activate a corresponding side of a brake circuit. One of the sides of the brake circuit is designed to brake the left rear wheel of the tractor, whereas the other side of the brake circuit is designed to brake the right wheel. A mechanical linkage is provided which allows the driver to selectively connect the left pedal (i.e. the pedal intended to brake the left rear wheel) and the right pedal (i.e. the pedal intended to brake the right rear wheel) one to another, or to disconnect the pedals one from another.

In transportation mode, e.g. when the tractor is travelling along a road, the mechanical linkage links the brake pedals to one another, so that when the driver pushes one pedal, both the rear wheels of the tractor are braked, irrespective of whether the driver pushes the right pedal, the left pedal or both. However, in certain working modes, the driver may disconnect the pedals one from another by releasing the mechanical linkage, so that it is possible to block the left rear wheel of the tractor without braking the right rear wheel, or vice versa. The tractor can thus be steered by acting on the brakes, which is appreciated for example when the tractor is in an end region of a field and it is desired to steer the tractor with a steering radius as small as possible. The tractor is also steered by acting on the brakes when the front wheels lift, e.g. while plowing, and steering by acting on the steering wheel is not possible.

In addition to the left rear wheel brake and to the right rear wheel brake, tractors often have further brakes, such as a trailer brake for braking a trailer hauled by the tractor and possibly front wheel brakes for braking the front wheels.

It might happen that the driver forgets to connect the rear wheel brake pedals to one another by means of the mechanical linkage during the transportation mode, e.g. when travelling on a road. This might imply very dangerous consequences. If the driver pushes only one pedal, only the corresponding rear wheel brake is activated, thereby causing the tractor to abruptly steer to the left or to the right, depending on which pedal had been acted on. The tractor can therefore unexpectedly occupy the opposite lane or go off the road. The situation is worsened by the trailer, which is not braked when the driver pushes only one rear wheel brake pedal. As a consequence, the trailer unbalances the tractor, which might even be overturned.

An object of the invention is to improve existing brake systems for controlling a brake of a unit hauled by a vehicle.

A further object is to provide a brake system for controlling a brake of a hauled unit, which increases safety of a vehicle hauling the unit, especially if the vehicle is travelling in a transportation mode.

Another object is to provide a brake system for controlling a brake of a hauled unit, which still allows a vehicle hauling the unit to be steered by acting on brakes of the vehicle, at least in certain working conditions.

According to the invention, there is provided a brake system for controlling a brake of a unit hauled by a vehicle, the brake system comprising:
  a first pedal for braking a right rear wheel of the vehicle through a first braking circuit;
  a second pedal for braking a left rear wheel of the vehicle through a second braking circuit;
  an input line arrangement including a first input line for receiving a fluid from the first braking circuit and a second input line for receiving a fluid from the second braking circuit;
  at least one output line for sending a fluid to the brake of the hauled unit;
  a selective connector for selectively connecting the input line arrangement to the output line by setting a first connection configuration when the vehicle has a speed greater than a threshold value and a second connection configuration when the vehicle has a speed lower than the threshold value, whereby in the first connection configuration pushing any of said pedals activates the brake of the hauled unit, and in the second connection configuration pushing only one of said pedals leaves the brake of the hauled unit inactive, so that the vehicle can be steered by braking.

Owing to the invention, it is possible to control the brake of the unit hauled by the vehicle in a way which depends on the vehicle's speed. When the speed is above the threshold value, the first connection configuration can be adopted in order to connect the input line arrangement to the output line. On the other hand, when the speed is below the threshold value, the input line arrangement can be connected to the output line according to the second connection configuration. Safety conditions can thus be ensured when travelling at a speed above the threshold value. Below the threshold value, less stringent safety precautions can be adopted, thereby ensuring that the driver has a greater freedom in operating the vehicle.

In particular, at speeds above the threshold value, the hauled unit is always braked when the driver pushes a pedal, irrespective of whether the driver pushes the first pedal, the second pedal, or both. It is thus possible to avoid the risk that, at a speed above the threshold value, the driver brakes only one rear wheel and, even if the vehicle is braked owing to a safety device, the hauled unit is not braked, thereby unbalancing the vehicle.

On the other hand, if the driver pushes only one pedal at speeds below the threshold value, the hauled unit remains non-braked and the vehicle can consequently be steered.

Thus, the driver can steer the vehicle by braking only one rear wheel when the vehicle is travelling at a speed below the threshold value, as occurs for example when the vehicle is working in a field. This does not imply safety risks for the driver or for other people, because below the threshold value the risk that the vehicle may be overturned is negligible. On the other hand, the driver appreciates the capability of steering by using the wheel brakes, since this allows the vehicle to steer in a much limited space.

The invention will be better understood and carried out with reference to the attached drawings, which show an exemplificative and non-limiting embodiment thereof, in which.

Figure 1:
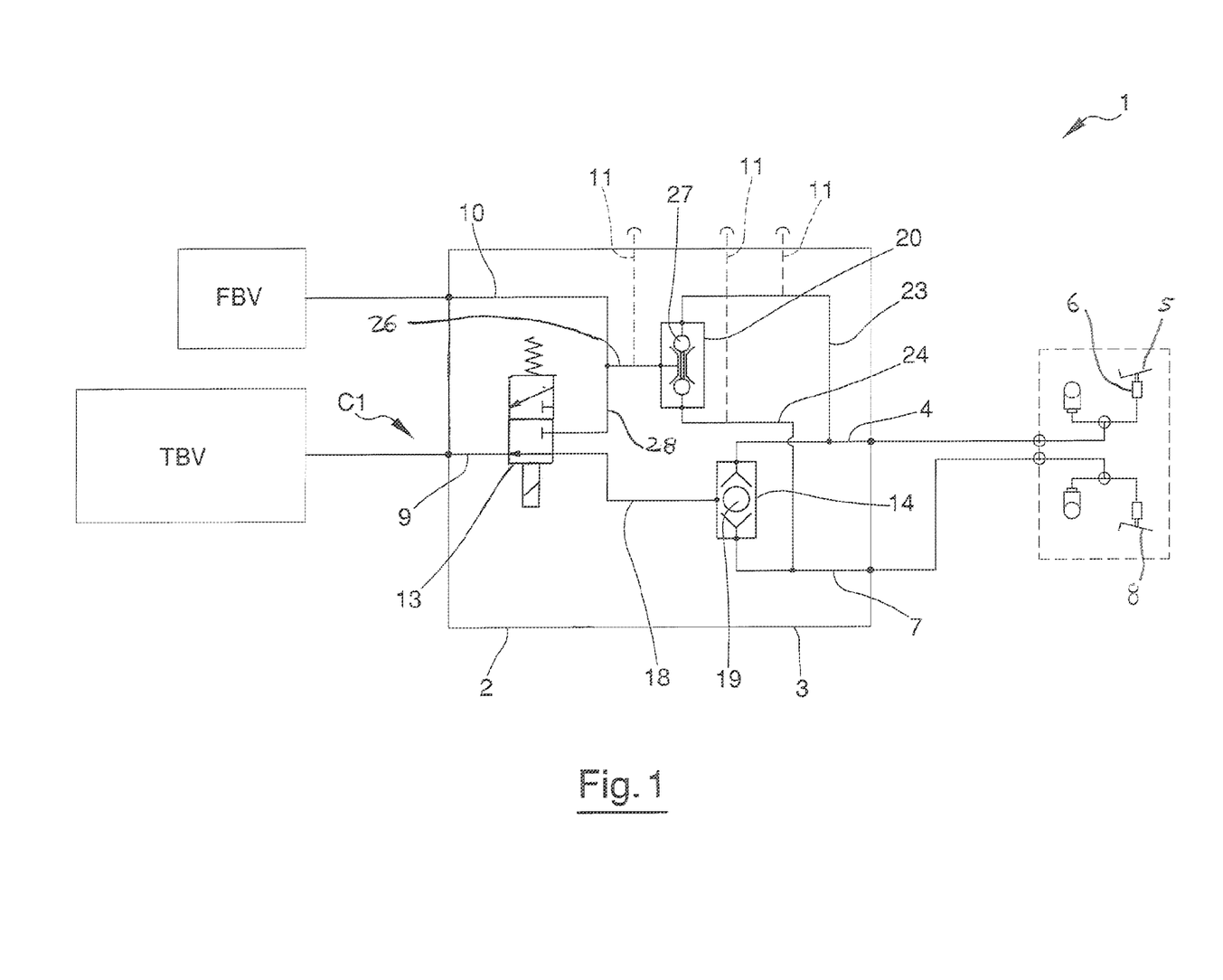
FIG. 1 is a schematic drawing showing a brake system for controlling a trailer brake of a vehicle, when the vehicle has a speed which is above a threshold value.
Figure 2:
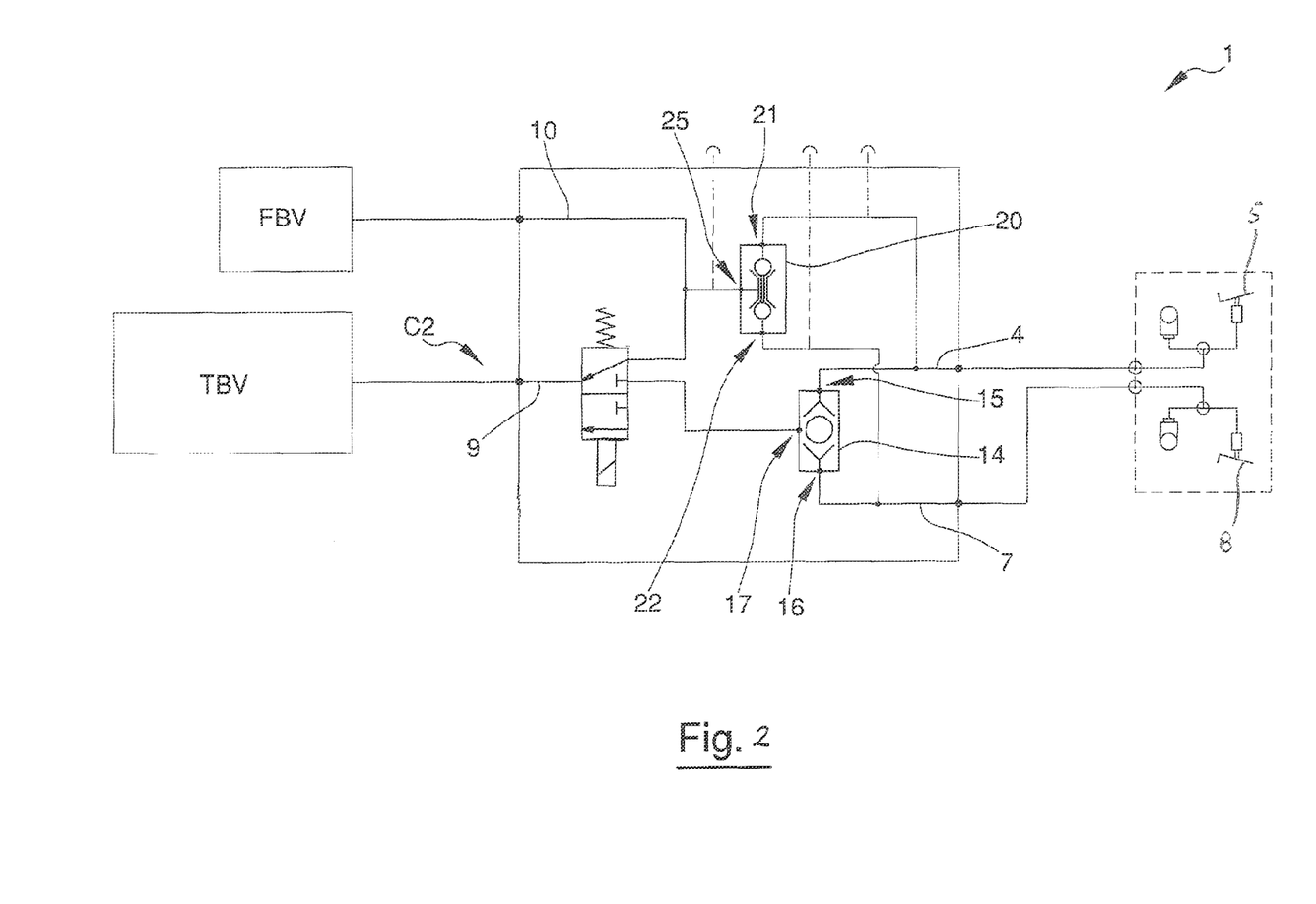
FIG. 2 is a schematic drawing of the brake system of FIG. 1, when the vehicle has a speed which is below the threshold value.

FIGS. 1 and 2 show a brake system 1 for controlling a brake of a unit hauled by a vehicle. The brake system 1 can be mounted on every kind of vehicle that can be equipped with a hauled unit. In particular, the brake system 1 is suitable for being used in working vehicles such as tractors. The unit hauled by the vehicle can be a trailer arranged to carry a load, but also an operating unit capable of performing certain tasks, for example an equipment for performing an operation on the ground in an agricultural field.

The brake system 1 comprises a controller 2 adapted to control the brake of the hauled unit and adapted to control further brakes as an option. The controller 2 comprises a plurality of components, that will be disclosed in detail later, housed in an enclosure 3.

The brake system 1 comprises a first input line 4 suitable for being connected with a first circuit, for example of a hydraulic type, which is not shown in detail. The first circuit is operable to brake a wheel of the tractor, for example a right wheel, particularly a right rear wheel. In order to brake the wheel associated with the first input line 4, the driver may act on a first activating element, particularly a first pedal 5. When the driver acts on the first pedal 5, a piston of a cylinder 6 is displaced, thereby sending a pressurized fluid in the first circuit and consequently braking the right rear wheel. By acting on the first pedal 5, the pressurized fluid is furthermore sent in the first input line 4.

The brake system 1 further comprises a second input line 7, suitable for being connected with a second circuit, particularly of a hydraulic type, which is not shown in detail. The second circuit is operable to brake a further wheel of the tractor, for example a left wheel, particularly a left rear wheel. An activating element such as a second pedal 8 is provided for sending a pressurized fluid in the second circuit and thereby braking the left rear wheel. When the pressurized fluid is sent in the second circuit, the pressurized fluid also reaches the second input line 7.

The first input line 4 and the second input line 7 define an input line arrangement for sending at least two input fluids to the controller 2.

The brake system 1 further comprises an output line 9 suitable for being connected to a brake of the hauled vehicle in order to control the brake of the hauled vehicle. The output line 9 can be connected to a control valve TBV which is capable of selectively sending an operating fluid to the brake of the hauled vehicle, thereby decreasing speed of the hauled vehicle or even stopping the latter.

When a fluid having a pressure greater than a preset value is sent in the output line 9, the control valve TBV is displaced in a position which causes the brake of the hauled vehicle to be activated.

The device 1 may optionally comprise a further output line 10 intended to be connected to a further brake of the vehicle, for example to a brake acting on the front wheels of the vehicle. The further output line 10 may be connected to a front brake valve FBV in order to control the latter. Depending on the position of the front brake valve FBV, the front wheels of the vehicle may either be braked or not.

One or more vent lines 11, indicated with dashed lines in FIG. 1, may be provided for discharging air from the fluid flowing through the components of the controller 2.

The controller 2 comprises an inverse shuttle valve 20, interposed between the input line arrangement and the valve 13. The inverse shuttle valve 20 has a first inlet port 21 and a second inlet port 22. The first inlet port 21 is connected to a first inlet line 23 branching from the first input line 4. The fluid flowing through the first inlet line 23 has therefore substantially the same pressure as the fluid flowing through the first input line 4.

The second inlet port 22 of the inverse shuttle valve 20 is connected to a second inlet line 24 branching from the second input line 7. The pressure of the fluid flowing in the second inlet line 24 is therefore substantially the same as the pressure of the fluid flowing in the second input line 7.

The inverse shuttle valve 20 has an outlet port 25 suitable for being connected to an exit line 26.

The inverse shuttle valve 20 has a closure element 27 configured to act on both the first inlet line 23 and the second inlet line 24 by opening or closing these lines. The inverse shuttle valve 20 puts the exit line 26 in fluid communication with the inlet line having the lowest fluid pressure among the first inlet line 23 and the second inlet line 24. This is made possible by the conformation of the closure element 27, on which the pressures of both the fluids flowing in the first inlet line 23 and in the second inlet line 24 act. If the fluid flowing in the first inlet line 23 has a pressure higher than the fluid flowing in the second inlet line 24, the fluid flowing in the first inlet line 23 displaces the closure element 27 in such a way as to close the first inlet line 23. The fluid coming from the second inlet line 24 therefore flows in the exit line 26.

The inverse shuttle valve 20 works as a hydraulic AND gate or logic AND valve. In other words, the inverse shuttle valve 20 gives a high output at the outlet port 25 if both the inputs at the inlet ports 21, 22 are high. If neither input is high, a low output results at the outlet port 25. Thus, the inverse shuttle valve 20 allows the fluid having the lowest pressure to pass from one of the inlet ports 21, 22 to the outlet port 25.

The controller 2 further comprises a selective connector for connecting the input line arrangement to the output line 9. The selective connector may comprise a valve, particularly a solenoid valve 13. The solenoid valve 13 may be a 3-ways/2-positions valve, as will be explained later in greater detail.

The valve 13 may take two different positions and hence connect the input line arrangement to the output line 9 in two different connection configurations. A first connection configuration C1 is shown in FIG. 1 and a second connection configuration C2 is shown in FIG. 2.

A control unit, which is not shown, is provided for controlling the valve 13. The control unit is so programmed that, when the vehicle has a speed greater than a threshold value, the valve 13 connects the input line arrangement to the output line 9 according to the first connection configuration C1. On the contrary, if the vehicle's speed is lower than the threshold value, the control unit is so programmed that the valve 13 connects the input line arrangement to the output line 9 according to the second connection configuration C2.

The controller 2 further comprises a shuttle valve 14 connecting the first input line 4 and the second input line 7 to the selective connector. The shuttle valve 14 has a first input port 15 to which the first input line 4 is connected. The shuttle valve 14 furthermore has a second input port 16 to which the second input line 7 is connected. Finally, the shuttle valve 14 has an output port 17. An intermediate line 18 is provided at the output port 17, so as to connect the shuttle valve 14 to the valve 13.

The shuttle valve 14 comprises a shutter 19 that can be displaced by the fluids coming from the first input line 4 and from the second input line 7. If the fluid flowing through the first input line 4 has a pressure which is substantially the same as the pressure of the fluid flowing through the second input line 7, the shutter 19 remains in a central position, as shown in FIG. 1, and the intermediate line 18 is in fluid communication with both the first input line 4 and the second input line 7. If, on the other hand, the fluid pressure in one of the input lines 4, 7 is greater than the fluid pressure in the other input line at least by a preset amount, then the fluid coming from the input line having the highest pressure pushes the shutter 19 until it closes the other input line. When this occurs, the intermediate line 18 is in fluid communication with the input line having the highest fluid pressure.

The shuttle valve 14 works as a hydraulic OR gate or logic OR valve. In other words, the shuttle valve 14 gives a high output at the output port 17 if one or both the inputs at the input ports 15, 16 are high. If neither input is high, a low output results at the output port 17. Thus, the shuttle valve 14 allows the fluid having the highest pressure to pass from one of the input ports 15, 16 to the output port 17.

From the exit line 26 a branch 28 originates, the branch 28 going towards the valve 13. The further output line 10, if present, also branches from the exit line 26.

In the first connection configuration C1, the valve 13 connects the intermediate line 18 to the output line 9. The branch 28 of the exit line 26 is isolated from the output line 9. In this configuration, the output line 9 is in fluid communication with the input line through which there flows the fluid having the highest pressure among the first input line 4 and the second input line 7.

In the second connection configuration C2, the valve 13 connects the output line 9 to the branch 28. In this configuration, the output line 9 is in fluid communication with the input line through which there flows the fluid having the lowest pressure among the first input line 4 and the second input line 7.

Figure 3:
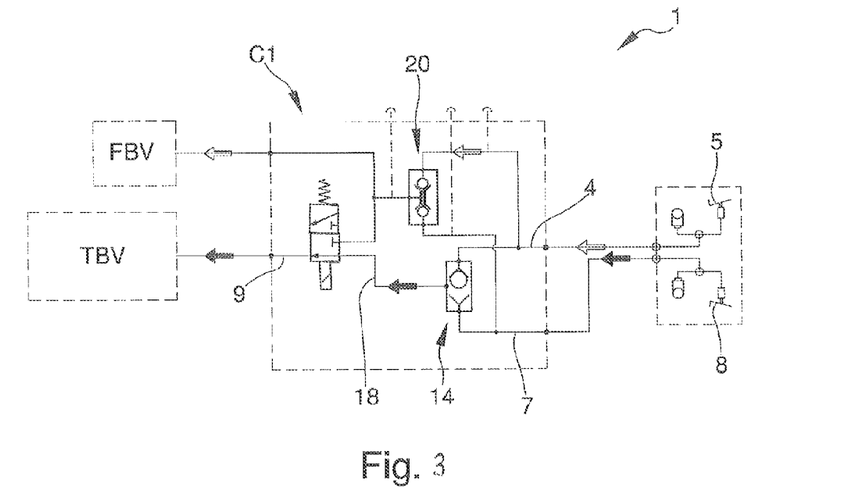
FIG. 3 is a view like FIG. 1, in a configuration in which a brake for braking a first wheel of the vehicle has been activated.

FIG. 3 shows the brake system 1 in a situation in which the tractor is advancing at a speed greater than the threshold speed and the driver has pushed only the second pedal 8 in order to brake the left rear wheel.

It is assumed that a linkage operable by the driver in order to mechanically connect the first pedal 5 and the second pedal 8 has not been activated, so that the second pedal 8 can be displaced independently of the first pedal 5 and vice versa.

By pushing the second pedal 8, the driver has sent a high-pressure fluid in the circuit associated to the brake acting on the left rear wheel. On the other hand, the pressure of the fluid circulating in the circuit associated to the brake acting on the left rear wheel is low, because the user has not pushed the first pedal 5.

The path of the high-pressure fluid is indicated with dark arrows in FIG. 3, whereas the path of the low-pressure fluid is indicated with white arrows in FIG. 3.

In this context, the words "high-pressure fluid" and "low-pressure fluid" are used simply to indicate that the fluid in an input line has a pressure greater than the fluid in the other input line. They do not however refer to a specific pressure value. In particular, the expression "low-pressure fluid" in this context could also mean that the fluid is not pressurized at all.

The high-pressure fluid, which has been pressurized when the driver pushed the second pedal 8, flows through the second input line 7 until it reaches the shuttle valve 14. In the shuttle valve 14, the high-pressure fluid displaces the shutter 19 and closes the first input line 4. Fluid coming from the first input line 4 cannot now flow downstream of the shuttle valve 14.

Thus, the fluid exiting the shuttle valve 14 is the high-pressure fluid coming from the second input line 7.

The first inlet port 21 of the inverse shuttle valve 20 receives the low-pressure fluid coming from the first input line 4. The second inlet port 22 of the inverse shuttle valve 20 receives the high-pressure fluid coming from the second input line 7. The combined action of these two fluids displaces the closure element 27 of the inverse shuttle valve 20 so that the second inlet line 24 is closed. The exit line 26 is therefore in fluid communication with the first inlet line 23, so that the low-pressure fluid coming from the first input line 4 is sent towards the valve 13. On the contrary, the high-pressure fluid coming from the second input line 7 does not flow downstream of the inverse shuttle valve 20.

Since the speed of the vehicle is greater than the threshold value, the control unit has switched the valve 13 in the first connection configuration C1. In this configuration, the output line 9 is in fluid communication with the intermediate line 18, whereas the fluid coming from the inverse shuttle valve 20 is stopped at the valve 13. The fluid flowing downstream of the valve 13 is therefore the high-pressure fluid coming from the second input line 7.

This high-pressure fluid enters inside the valve TBV, thereby activating the brake of the hauled unit. As a consequence, the hauled unit is braked, even if the driver had pushed only one pedal, namely the second pedal 8.

The low-pressure fluid flowing downstream of the inverse shuttle valve 20 reaches the valve FBV controlling the brake acting on the front wheels of the hauling vehicle. Since this fluid is a low-pressure fluid, its pressure is insufficient to activate the brake associated to the front wheels. The front wheels are therefore not braked.

Figure 4:
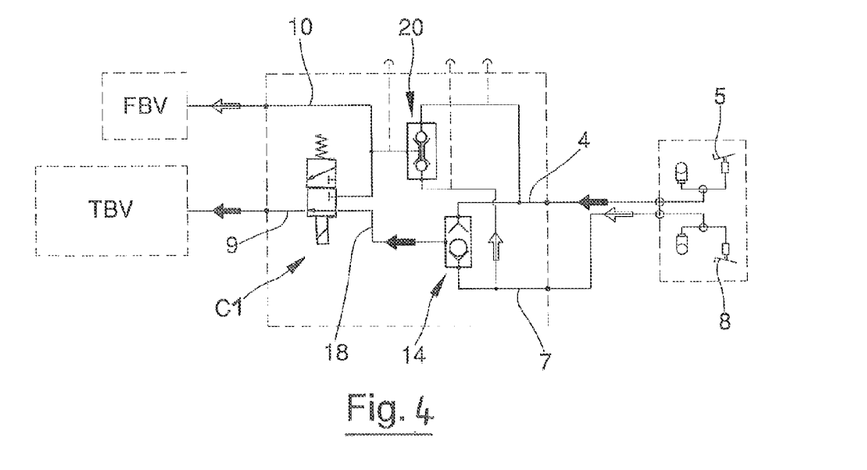
FIG. 4 is a view like FIG. 1, in a configuration in which a brake for braking a second wheel of the vehicle has been activated.

FIG. 4 shows a situation in which the vehicle is travelling at a speed greater than the threshold speed and the driver pushes only the first pedal 5, associated to the brake of the right rear wheel. The second pedal 8 is not pushed by the driver, and it remains stationary since the linkage for connecting the two pedals has not been activated.

By pushing the first pedal 5, a high-pressure fluid is sent in the circuit associated with the brake acting on the right rear wheel and also in the first input line 4. The fluid in the second input line 7 is instead a low-pressure fluid, since the second pedal 8 has not been displaced.

The force resulting from fluid pressure in the first input line 4 and in the second input line 7 displaces the shutter 19 of the shuttle valve 14 in a position such as to close the second input line 7. The high-pressure fluid coming from the first input line 4 hence flows downstream of the shuttle valve 14 and reaches the valve 13. The latter is in the first connection configuration C1, because the vehicle's speed is above the threshold value. Consequently, the high-pressure fluid coming from the first input line 4 passes through the valve 13 to flow into the outlet line 9. From the outlet line 9, the high-pressure fluid reaches the valve TBV controlling the brake of the hauled unit. Due to its high pressure, the fluid entering the valve TBV and coming from the first input line 4 causes the hauled unit to be braked.

The front wheels brake is still not activated, since the fluid flowing in the further output line 10 is the low-pressure fluid coming from the second input line 7.

It is clear from the above that the brake system 1 ensures that, when the speed of the vehicle is above the threshold speed, the hauled unit is braked each time the driver pushes a pedal associated to a rear wheel brake, irrespective of whether the driver pushes the first pedal 5 or the second pedal 8 and even if the linkage device between the pedals has not—intentionally or unintentionally—been activated.

This ensures that the vehicle is in a safe condition when travelling above the threshold value. There is no risk that the vehicle is unbalanced due to the hauled unit being non-braked when the rear wheels of the hauling vehicle are braked.

Hence, the vehicle is in a safe condition in the transportation mode, because the threshold speed is normally reached only if the vehicle is advancing on a road and not if the vehicle is working in a field.

Of course, the hauled vehicle is braked also if the driver pushes simultaneously both the first pedal 5 and the second pedal 8, or if the driver pushes only one pedal after activating the linkage between the pedals 5, 8.

Figure 5:
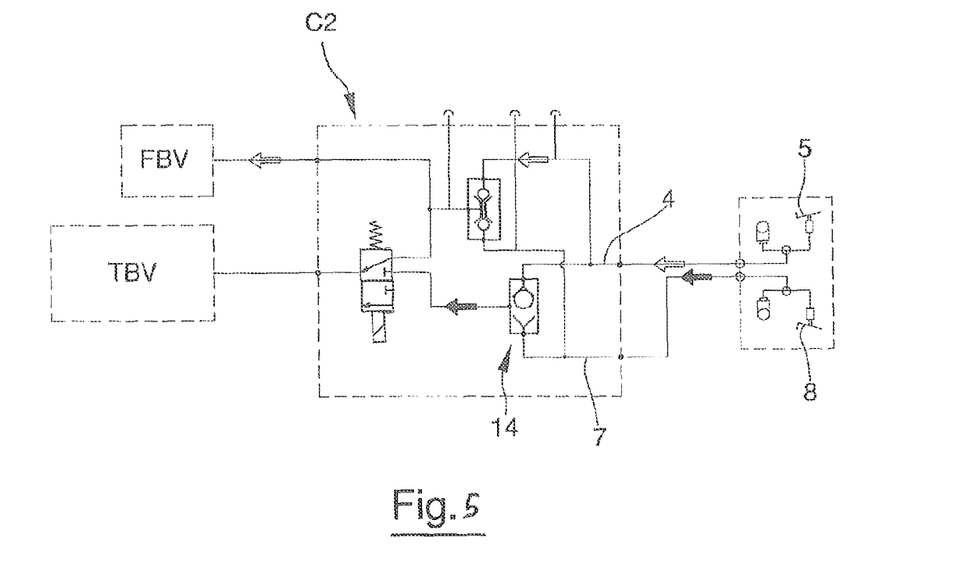
FIG. 5 is a view like FIG. 2, in a configuration in which the brake for braking the first wheel of the vehicle has been activated.

FIG. 5 shows a situation in which the vehicle has a speed below the threshold speed and the driver is pushing only the second pedal 8, associated to the brake acting on the left rear wheel. The first pedal 5 is not touched by the operator and remains in an inoperative position since the linkage between the two pedals has not been activated.

By pushing the second pedal 8, a high-pressure fluid is sent in the circuit associated to the left rear wheel in order to brake the latter. The high-pressure fluid is also sent in the second input line 7, as indicated by the dark arrow.

The fluid present in the first input line 4 is instead a low-pressure fluid, as indicated by the white arrow, because the user has not acted on the first pedal 5 and hence on the corresponding circuit.

Due to the different pressures of the fluids coming respectively from the first input line 4 and from the second input line 7, the shutter 19 of the shuttle valve 14 is so displaced as to close the low-pressure line, i.e. the first input line 4. The high-pressure line, i.e. the second input line 7, is instead in fluid communication with the intermediate line 18, so that the high-pressure fluid coming from the second input line 7 flows downstream of the shuttle valve 14.

Simultaneously, the low-pressure fluid coming from the first input line 4 reaches the first inlet port 21 of the inverse shuttle valve 20 through the first inlet line 23. The high-pressure fluid coming from the second input line 7 reaches the second inlet port 22 of the inverse shuttle valve 20 through the second inlet line 24. The closure element 27 is so displaced as to allow flow of the low-pressure fluid coming from the first input line 4 downstream of the inverse shuttle valve 20.

The valve 13 is in the second connection configuration C2, because the speed of the vehicle is lower than the threshold speed. In this configuration, the high-pressure fluid coming from the second input line 7 through the shuttle valve 14 is prevented from flowing downstream of the valve 13. The low-pressure fluid coming from the first input line 4 through the inverse shuttle valve 20, on the other hand, is allowed to pass through the valve 13 and to flow into the output line 9. From the output line 9, the low-pressure fluid reaches the valve TBV controlling the brake of the hauled unit. However, the low-pressure fluid is not capable of activating the valve TBV due to its low pressure. As a consequence, the hauled unit is not braked.

The driver is therefore free to steer the vehicle by acting only on the left wheel brake, which does not however imply particular risks due to the low speed at which the vehicle is travelling.

The front wheels are also not braked, because in the further output line 10 the low-pressure fluid circulates, which does not have a pressure sufficient to displace the front brake valve FBV in a position activating the corresponding brake. Thus, the front wheels do not hinder steering of the vehicle in the desired direction.

Figure 6:
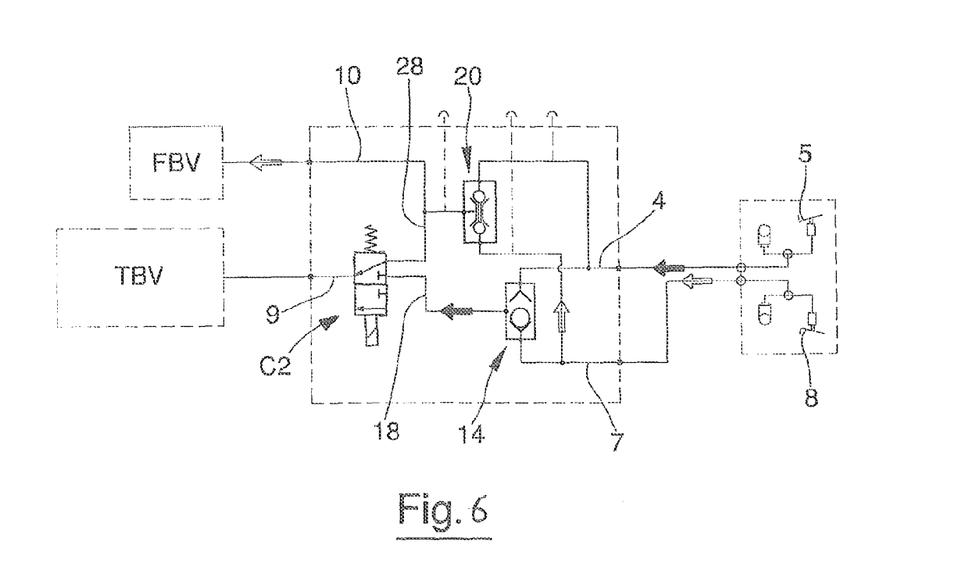
FIG. 6 is a view like FIG. 2, in a configuration in which the brake for braking the second wheel of the vehicle has been activated.

FIG. 6 shows a situation in which the vehicle is travelling at a speed lower than the threshold speed and the driver has pushed only the first pedal 5, without acting on the second pedal 8. In this situation, the driver has therefore braked the right rear wheel.

No linkage is linking the two pedals 5, 8.

A high-pressure fluid is circulating in the first input line 4, whereas a low-pressure fluid flows through the second input line 7. The shuttle valve 14 connects the first input line 4 to the intermediate line 18 and the high-pressure fluid flows from the first input line 4 downstream of the shuttle valve 14. However, due to the configuration of the valve 13, the high-pressure fluid from the intermediate line 18 cannot flow downstream of the valve 13.

The high-pressure fluid and the low-pressure fluid coming respectively from the first input line 4 and from the second input line 7 also reach the inverse shuttle valve 20, which allows passage only of the low-pressure fluid. The latter then flows through the branch 28 and reaches the valve 13. Due to the configuration of the valve 13, the low-pressure fluid is allowed to flow from the branch 28 to the output line 9 and hence to reach the valve TBV controlling braking of the hauled unit. However, the low-pressure fluid, due its low pressure, is not capable of causing the valve TBV to brake the hauled unit. The latter remains therefore non-braked.

The driver is capable of steering the vehicle by acting on the first pedal 5 and the hauled unit does not oppose this operation.

The front brake wheels are also not braked, because the fluid flowing downstream of the inverse shuttle valve 20 towards the further output line 10 is the low-pressure fluid, which is not capable to activate the brake associated to the front wheels.

It is clear from the above that the device 1 ensures that, if the drives pushes only one of the pedals 5, 8 when the vehicle is travelling below the threshold speed, the hauled unit is not braked and the driver can easily steer the vehicle by braking a single rear wheel.

If, when travelling below the threshold speed, the driver pushes both the pedals 5, 8 because he or she intends to brake the vehicle, a fluid having a relatively high pressure circulates both in the first input line 4 and in the second input line 7. The fluid reaching the valve TBV—irrespective of whether it comes from the first input line 4, the second input line 7 or both—has therefore a pressure which is sufficient to activate the brake of the hauled unit, as desired by the driver.

For the same reason, the pressure of the fluid flowing from the inverse shuttle valve 20 towards the front brake valve FBV has a pressure which is sufficient to activate the brake of the front wheels, which helps in stopping or slowing the vehicle.

To summarize, when the valve 13 is in the first connection configuration C1, i.e. at a speed above the threshold speed, the control valve TBV associated to the brakes of the hauled unit is activated—through the shuttle valve 14—each time the driver pushes at least one pedal selected between the first pedal 5 and the second pedal 8, i.e. when the driver pushes the first pedal 5, or the second pedal 8, or both. The front brake valve FBV, on the other hand, is activated only if the driver pushes both the pedals 5, 8.

On the other hand, when the valve 13 is in the second connection configuration C2, i.e. at a speed below the threshold speed, the control valve TBV associated to the brakes of the hauled unit is activated—through the inverse shuttle valve 20—only when both pedals 5, 8 are pushed at the same time. Also the front brake valve FBV is activated only if the driver pushes both the pedals 5, 8.

Thus, the device 1 increases safety of the vehicle when the latter has a speed above the threshold speed, without however jeopardizing ease of operation by the driver, especially as far as steering operations are concerned, when the speed is so low as not to involve substantial risks.

In the above example, the controller 2 is a hydraulic device. The controller 2 is used to control the front brake valve FBV operable to brake the front wheels of the vehicle and the control valve TBV operable to brake the hauled vehicle. The front brake valve FBV and/or the control valve TBV can either be pneumatic or hydraulic.

Figure 7:
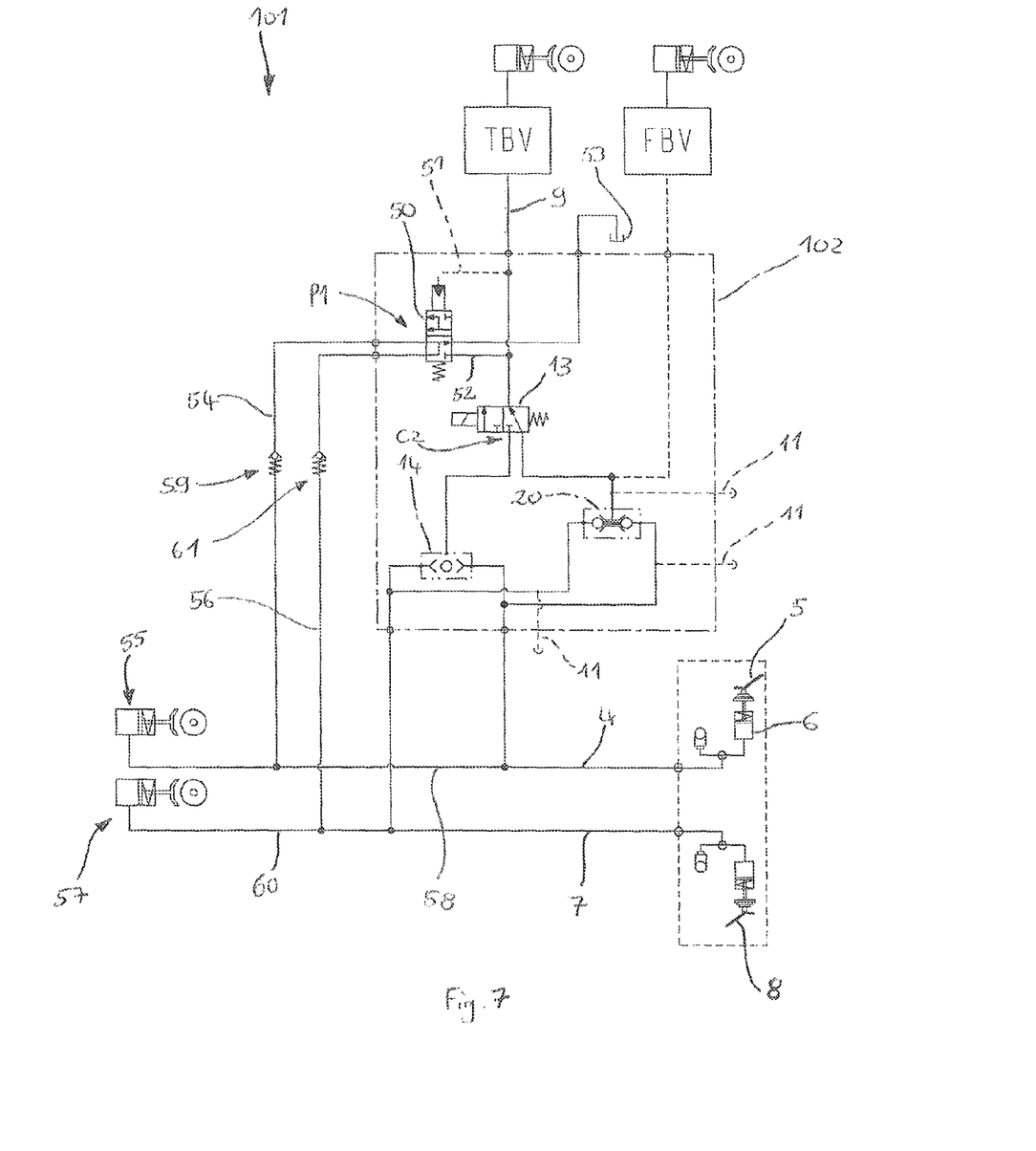
FIG. 7 is a schematic drawing showing a brake system for controlling a trailer brake of a vehicle, according to an alternative embodiment.

FIG. 7 shows a brake system 101 for controlling a brake of a unit hauled by a vehicle according to an alternative embodiment. The components of the brake system 101 that are similar to those of the brake system 1 will be indicated with the reference numerals already used in FIGS. 1 to 6 and will not be described again in detail.

The brake system 101 comprises a controller 102 which—like the controller 2 which has been previously described—includes the valve 13, the shuttle valve 14 and the inverse shuttle valve 20. However, the controller 102 further comprises a piloted valve 50 which allows both the rear wheel brakes to be activated when the speed of the vehicle is above the threshold value.

The piloted valve 50 is a 4-ways valve having a first way connectable to a branch 52 which is in fluid communication with the output line 9 and a second way connectable to a discharge 53. A third way of the piloted valve 50 is connectable to a first brake line 54 associated to a first rear wheel brake 55, for example a rear right wheel brake, for braking the corresponding rear wheel. Finally, a fourth way of the piloted valve 50 is connectable to a second brake line 56 associated to a second rear wheel brake 57, for example a rear left wheel brake, for braking the corresponding rear wheel.

The piloted valve 50 is a 2-positions valve having a distributor element which is displaceable between two positions by the pressurized fluid flowing through a pilot conduit 51. The pilot conduit 51 is connected to the output line 9 exiting the valve 13. Thus, the piloted valve 50 is piloted by the pressurized fluid coming from the valve 13.

In a first position P1, shown in FIG. 7, the first brake line 54 and the second brake line 56 are connected to the discharge 53. The branch 52 is closed, so that no fluid from the output line 9 can flow through the piloted valve 50.

Figure 8:
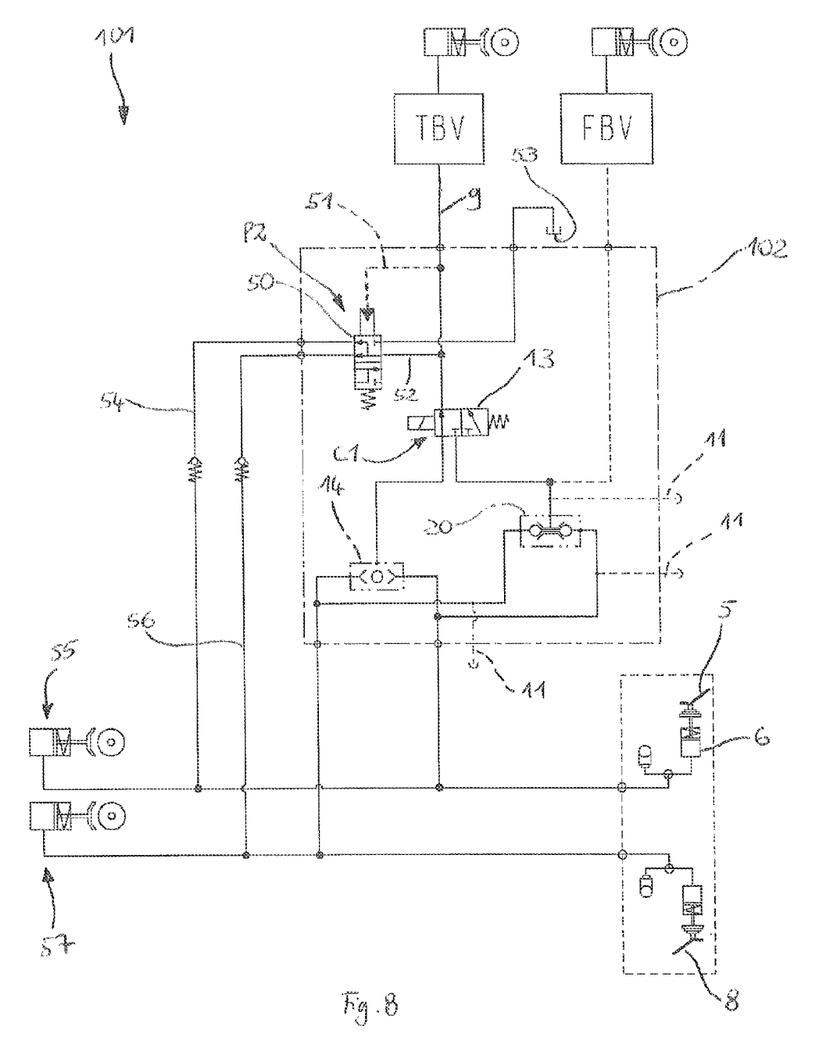
FIG. 8 is a view like FIG. 7, showing the brake system in a different configuration.

In a second position P2, shown in FIG. 8, the branch 52 is connected to the first brake line 54 and to the second brake line 56. The discharge 53 is isolated.

The distributor element of the piloted valve 50 is so configured as to be displaced in the second position P2 when pressure of the fluid flowing through the output line 9 is above a preset value, i.e. when there is a high pressure in the output line 9. On the contrary, the distributor element of the piloted valve 50 is displaced in the first position P1 when pressure of the fluid flowing in the output line 9 drops below the preset value, i.e. when the fluid in the output line 9 is at a low pressure.

The first input line 4, which is interposed between the first pedal 5 and the shuttle valve 14, has a section 58 which reaches the first rear wheel brake 55. The first brake line 54 branches from the section 58. A non-return valve 59 is arranged along the first brake line 54 and prevents the fluid flowing through the section 58 from reaching the piloted valve 50, while allowing the fluid coming from the piloted valve 50 to reach the first rear wheel brake 55.

Similarly, the second input line 7, which is interposed between the second pedal 8 and the shuttle valve 14, has a further section 60 which arrives at the second rear wheel brake 57. The second brake line 56 branches from the further section 60. A further non-return valve 61 is arranged along the second brake line 56 and stops the flow of fluid from the second input line 7 towards the piloted valve 50, while allowing the flow of fluid from the piloted valve 50 towards the second rear wheel brake 57.

The brake system 101 works as disclosed below.

When the speed of the vehicle is below the threshold value, the valve 13 is in the second configuration C2, as shown in FIG. 7. As previously explained, in the second configuration C2, the fluid flowing through the output line 9 is a low-pressure fluid, even if the driver pushes one or both the pedals 5, 8. The piloted valve 50 is in the first position P1, because the pressure of the fluid in the pilot conduit 51 is not sufficient to displace the piloted valve 50 into the second position P2. Consequently, no fluid reaches the first rear wheel brake 55 or the second rear wheel brake 57 from the piloted valve 50.

The high-pressure fluid coming either from the first input line 4 (if the driver pushes the first pedal 5) or from the second line 7 (if the driver pushes the second pedal 8) nevertheless reaches the corresponding rear wheel brake either through the section 58 or the further section 60. Thus, if the driver pushes only the first pedal 5, only the first rear wheel brake 55 is activated. Similarly, if the driver pushes only the second pedal 8, only the second rear wheel brake 57 is activated.

The hauled unit remains non-braked.

When the speed of the vehicle is above the threshold value, the valve 13 is in the first configuration C1, as shown in FIG. 8. If the driver pushes one or both the pedals 5, 8, a high-pressure fluid flows downstream of the valve 13 and in the output line 9. The high-pressure fluid passes into the pilot conduit 51 and displaces the piloted valve 50 into the second position P2. Consequently, the high-pressure fluid coming from the output line 9 passes through the branch 52 and the piloted valve 50, thereby reaching the first brake line 54 and the second brake line 56. Both the first rear wheel brake 55 and the second rear wheel brake 57 are then activated, irrespective of whether the driver pushed only the first pedal 5 or the second pedal 8.

The piloted valve 50 allows the safety of the vehicle travelling at a speed above the threshold value to be significantly increased. If the vehicle's speed is above the threshold value, not only is the hauled unit braked through the control valve TBV, but also both the first rear wheel brake 55 and the second rear wheel brake 57 are activated, irrespective of whether the driver pushed the first pedal 5, the second pedal 8, or both. Thus, if the driver pushes only one pedal amongst the first pedal 5 and the second pedal 8, the vehicle decreases its speed while remaining stable, because both the hauled unit and the rear wheel brakes are activated.

On the contrary, at speeds below the threshold value the driver may still push only one of the pedals 5, 8 and brake only one rear wheel, so as to be able to steer by braking.

Figure 9:
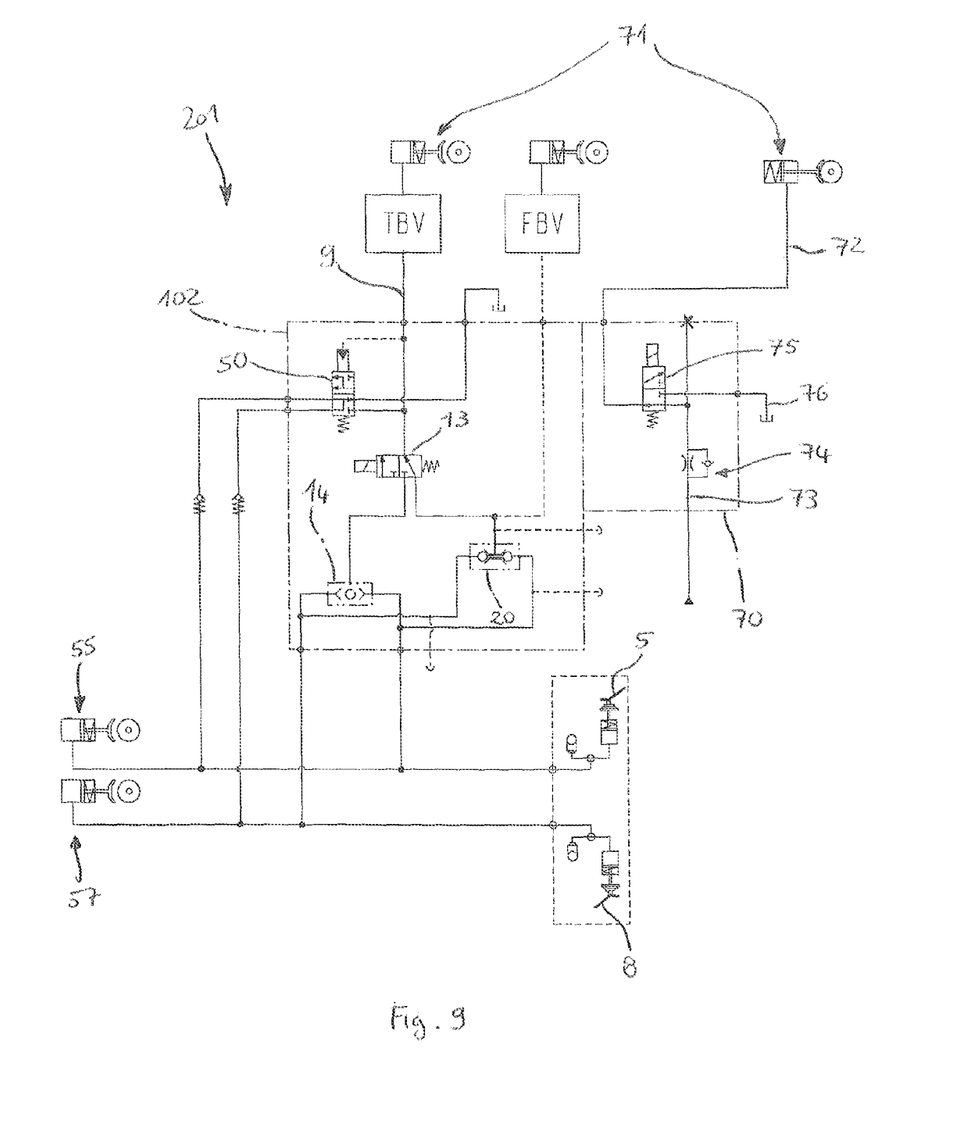
FIG. 9 is a schematic drawing showing a brake system for controlling a trailer brake of a vehicle, according to another alternative embodiment.

FIG. 9 shows a brake system 201 for controlling a brake of a unit hauled by a vehicle according to another alternative embodiment. The components of the brake system 201 that are common to the brake systems 1, 101 will be indicated with the previously used reference numerals and will not be described again in detail.

The brake system 201 differs from the brake system 101 mainly because it comprises a safety device 70 for acting on a trailer brake 71 which is capable of braking the unit hauled by the vehicle. Although the trailer brake 71 has been shown twice in FIG. 9, it is intended that the two components indicated by the reference numeral 71 in FIG. 9 are actually the same trailer brake.

As explained before, the trailer brake 71 is controlled through the control valve TBV by the fluid flowing in the output line 9. The output line 9 can be considered as an adjustable high-pressure line controlling the trailer brake 71. The pressure in the output line 9 is adjustable because it depends on the pressure exerted by the driver on one or both the pedals 5, 8. Furthermore, the pressure in the output line 9 can be considered as a high-pressure because it may range from zero to a relatively high value, for example of greater than 100 bar.

A further line 72 can be provided for controlling the trailer brake 71, the further line 72 controlling the trailer brake 71 through the safety device 70. As will be explained in greater detail hereinbelow, the further line 72 can be considered as a low-pressure line, because it receives a fluid having a pressure lower than the pressure flowing through the output line 9, for example a pressure lower than 50 bar.

Figure 10:
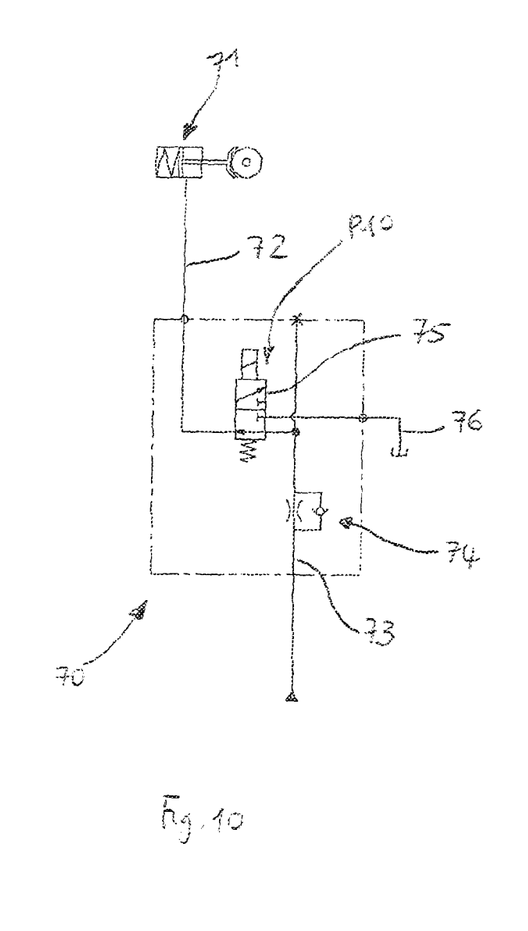
FIG. 10 is a schematic view showing a safety device for controlling the trailer brake of the vehicle, which is included in the brake system of FIG. 9.

The safety device 70 comprises an entry line 73 for receiving a low-pressure fluid which may come, for example, from a circuit supplying other points of use provided on the vehicle. A throttling element 74 may be provided along the entry line 73 for eliminating possible peaks in the pressure of the fluid flowing through the entry line 73.

The safety device 70 further comprises a valve element 75, particularly an electro-valve, for controlling the further line 72. The valve element 75 can be normally open.

The valve element 75 is a three-ways valve, having a first way connectable to the further line 72, a second way connectable to the entry line 73 and a third way connectable to a discharge path 76.

Figure 11:
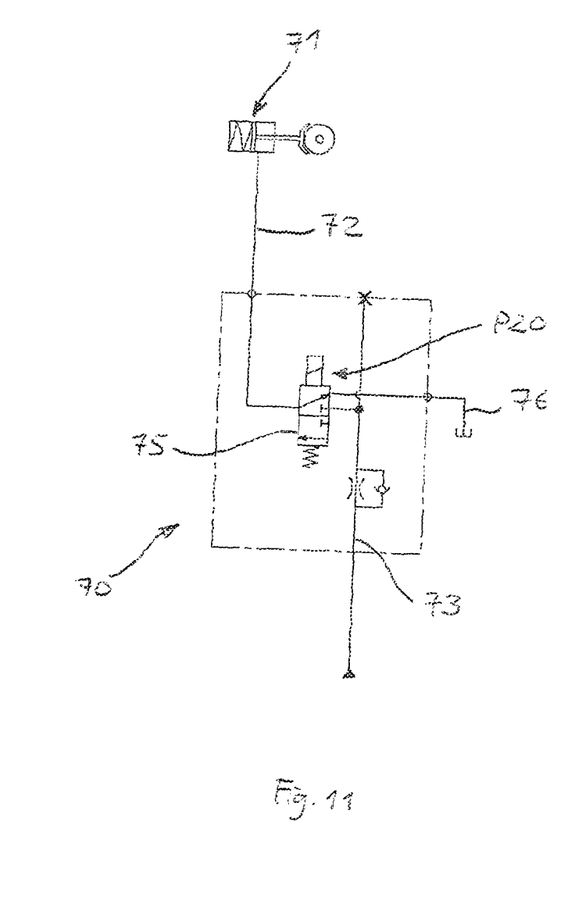
FIG. 11 is a view like FIG. 10, showing the safety device in a different configuration.

The valve element 75 is a two-positions valve, which may be either in a position P10 shown in FIG. 10, or in a further position P20 shown in FIG. 11.

In the position P10, the entry line 73 is in fluid communication with the further line 72. The discharge path 76 is isolated.

In the further position P20, the further line 72 is in fluid communication with the discharge path 76. The input line 73 is interrupted at the valve element 75, so that fluid coming from the input line 73 cannot flow downstream of the valve element 75.

The further line 72 is so connected to the trailer brake 71 that, when a fluid flows to the trailer brake 71 through the input line 73 and the further line 72, the hauled unit is non-braked. On the contrary, when no fluid arrives at the trailer brake 71 through the further line 72, the hauled unit is braked.

The valve element 75 is controlled by a signal indicative of the status of a parking brake of the vehicle. When the parking brake of the vehicle is not applied, i.e. not activated, the valve element 75 is in the position P10. The fluid coming from the entry line 73 passes into the further line 72 through the valve element 75, so that the hauled unit is left non-braked. In this situation, the trailer brake 71 may be activated by acting on the pedals 5, 8, owing to the fluid flowing through the output line 9.

When the parking brake of the vehicle is applied, i.e. is activated, the valve element 75 is in the further position P20. The entry line 73 is thus isolated from the trailer brake 71. The further line 72 is in fluid communication with the discharge path 76, so that no fluid goes to the trailer brake 71 and the hauled unit is braked.

It is clear from the above that the output line 9 and the further line 72 provide a two-line system for controlling the trailer brake 71. As explained before, the output line 9 is an adjustable, high-pressure line.

The further line 72, on the other hand, can be considered as a low-pressure line, since it receives a fluid having a pressure lower than the pressure in the output line 9. Furthermore, the further line 72 is not an adjustable pressure line, but is rather a line of the on-off type, in which pressure can have either a lower value or a greater value. In particular, the lower value may be zero, whereas the greater value is the pressure value of the fluid coming from a circuit of the vehicle which supplies several points of use.

During operation, when the vehicle is stationary and its engine is off, there is no fluid pressure in the output line 9, neither in the further line 72.

If the engine is running but the driver is not acting on the pedals 5, 8, nor is the parking brake activated, then the pressure in the output line 9 is substantially zero, but a pressurized fluid flows through the further line 72. The hauled unit is therefore non-braked.

If the engine is running and the driver acts on one or both the pedals 5, 8, but the parking brake is not activated, then a pressurized fluid flows through the further line 72. The further line 72 does not brake the hauled unit and hence leaves the trailer brake 71 unaffected. The hauled unit is nevertheless braked through the control valve TBV, owing to the high-pressure fluid flowing through the output line 9.

Finally, if the engine is running and the driver is not acting on the pedals 5, 8, but the parking brake is applied, then pressure in the further line is zero. The trailer brake 71 is thus activated.

It is clear from the above that the safety device 70 provides an additional line, i.e. the further line 72, for controlling the trailer brake 71. The trailer brake 71 is thus controlled by means of a two-lines system, which increases safety thereof.

In particular, the safety device 70 ensures that, each time the parking brake is activated, the trailer brake 71 brakes the hauled unit. This increases safety of the vehicle, by reducing the risk that the hauled unit may be moved when the vehicle is stationary and the engine is off.

It is intended that the two-lines system based on the safety device 70 could be used also in brake systems which do not comprise the controller 2, 102, 202. In this case, the further line 72 of the safety device 70 could be used as a low-pressure line in combination with a traditional high-pressure line.

The invention claimed is:

1. A brake system for controlling a brake of a unit hauled by a vehicle, the brake system comprising:
   a first pedal for braking a right rear wheel of the vehicle through a first braking circuit;
   a second pedal for braking a left rear wheel of the vehicle through a second braking circuit;
   an input line arrangement including a first input line for receiving a fluid from the first braking circuit and a second input line for receiving a fluid from the second braking circuit;
   at least one output line for sending a fluid to the brake of the hauled unit;
   a two-positions valve configured to switch between a first connection configuration when the vehicle has a speed greater than a threshold value and a second connection configuration when the vehicle has a speed lower than the threshold value to selectively connect the input line arrangement to the output line;
   a logic AND valve interposed between the input line arrangement and the two-positions valve for sending to the two-positions valve the fluid having the lowest pressure between the first input line and the second input line; and
   a logic OR valve interposed between the input line arrangement and the two-positions valve for sending to the two-positions valve the fluid having the highest pressure between the first input line and the second input line,
   whereby in the first connection configuration pushing any of the pedals activates the brake of the hauled unit, and in the second connection configuration pushing only one of the pedals leaves the brake of the hauled unit inactive, so that the vehicle can be steered by braking.

2. The brake system of claim 1, wherein, in each of the first and second connection configurations, the two-positions valve is configured to allow fluid communication between the output line and one of the first input line and the second input line.

3. The brake system of claim 1, comprising a control unit programmed for commuting the two-positions valve between a first position corresponding to the first connection configuration and a second position corresponding to the second connection configuration, depending on the speed of the vehicle.

4. The brake system of claim 1, wherein, in the first connection configuration, the two-positions valve enables fluid communication between the logic OR valve and the output line.

5. The brake system of claim 1, wherein, in the second connection configuration, the two-positions valve enables fluid communication between the logic AND valve and the output line.

6. The brake system of claim 1, comprising a valve for controlling a front wheel brake, the valve being connected to the logic AND valve so as to activate the front wheel brake when fluid pressure downstream of the logic AND valve exceeds a preset value.

7. The brake system of claim 1, comprising a valve for connecting the output line with a first brake line associated to a right rear wheel brake of the vehicle and with a second brake line associated to a left rear wheel brake of the vehicle at a speed above the threshold value, so that both the rear wheels of the vehicle are braked when any of the pedals is pushed above the threshold value.

8. The brake system of claim 7, wherein the valve is piloted by pressure of a fluid flowing through the output line.

9. The brake system of claim 1, wherein the output line defines an adjustable, high-pressure line for controlling the brake of the hauled unit, the device further comprising a further line acting as a low-pressure line for controlling the brake of the hauled unit.

10. The brake system of claim 9, wherein a valve element is arranged along the further line, the valve element being displaceable by a signal indicative of the status of a parking brake of the vehicle.

11. The brake system of claim 10, wherein the valve element is so configured as to cause the hauled unit to be braked when the parking brake is activated.

12. The brake system of claim 1, wherein the two-positions valve comprises a solenoid valve.

13. The brake system of claim 1, comprising a logic AND valve interposed between the input line arrangement and the two-positions valve for sending to the two-positions valve the fluid having the lowest pressure between the first input line and the second input line.

14. The brake system of claim 4, wherein, in the second connection configuration, the two-positions valve enables fluid communication between the logic AND valve and the output line.

15. The brake system of claim 11, wherein the valve element is configured to cause the hauled unit to be braked by interrupting supply of a fluid to the brake of the hauled unit through the further line.

16. A brake system for controlling a brake of a unit hauled by a vehicle, the brake system comprising:
   a first pedal for braking a right rear wheel of the vehicle through a first braking circuit;
   a second pedal for braking a left rear wheel of the vehicle through a second braking circuit;
   an input line arrangement including a first input line for receiving a fluid from the first braking circuit and a second input line for receiving a fluid from the second braking circuit;
   at least one output line for sending a fluid to the brake of the hauled unit;
   a two-positions valve between the output line and the input line arrangement;
   a logic AND valve interposed between the input line arrangement and the two-positions valve for sending to the two-positions valve the fluid having the lowest pressure between the first input line and the second input line; and
a logic OR valve interposed between the input line arrangement and the two-positions valve for sending to the two-positions valve the fluid having the highest pressure between the first input line and the second input line,
wherein the two-positions valve is configured to switch between a first connection configuration that provides fluid communication between the logic OR valve and the output line when the vehicle has a speed greater than a threshold value and a second connection configuration that provides fluid communication between the logic AND valve and the output line when the vehicle has a speed lower than the threshold value to selectively connect the input line arrangement to the output line.

* * * * *